US007609930B2

United States Patent
Aoyagi et al.

(10) Patent No.: US 7,609,930 B2
(45) Date of Patent: Oct. 27, 2009

(54) PLASTIC OPTICAL FIBER CABLE

(75) Inventors: Amane Aoyagi, Hiroshima (JP); Yoshihiro Tsukamoto, Hiroshima (JP); Yasushi Fujishige, Hiroshima (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 173 days.

(21) Appl. No.: 11/919,983

(22) PCT Filed: May 9, 2006

(86) PCT No.: PCT/JP2006/309329

§ 371 (c)(1),
(2), (4) Date: Nov. 6, 2007

(87) PCT Pub. No.: WO2006/121048

PCT Pub. Date: Nov. 16, 2006

(65) Prior Publication Data

US 2009/0067794 A1    Mar. 12, 2009

(30) Foreign Application Priority Data

May 9, 2005   (JP) .............................. 2005-136655
Jul. 12, 2005  (JP) .............................. 2005-203171

(51) Int. Cl.
   *G02B 6/02* (2006.01)
(52) U.S. Cl. ...................................... 385/128
(58) Field of Classification Search ................. 385/128
   See application file for complete search history.

(56) References Cited

U.S. PATENT DOCUMENTS

| 4,836,642 A  * | 6/1989 | Matsumoto et al. ......... 385/145 |
| 5,146,531 A  * | 9/1992 | Shustack ..................... 385/128 |
| 7,022,801 B2 * | 4/2006 | Medsker ....................... 528/27 |

FOREIGN PATENT DOCUMENTS

| JP | 63-040109 A   | 2/1988  |
| JP | 11-101915     | 4/1999  |
| JP | 2001-324626   | 11/2001 |
| JP | 2002-055243 A | 2/2002  |
| JP | 2002-148451   | 5/2002  |
| JP | 2003-227942   | 8/2003  |
| JP | 2005-099447 A | 4/2005  |

* cited by examiner

*Primary Examiner*—Uyen Chau N Le
*Assistant Examiner*—Hoang Tran
(74) *Attorney, Agent, or Firm*—Fitch, Even, Tabin & Flannery; Kendrew H. Colton

(57) ABSTRACT

The invention provides a plastic optical fiber cable comprising a plastic optical fiber having a core/clad structure, a light blocking coating layer provided around the plastic optical fiber, and a protective coating layer provided between the outermost layer of the core/clad structure and the light blocking coating layer. The outermost layer of the core/clad structure is made of a fluorine-containing olefin polymer containing at least a tetrafluoroethylene unit, the crystal melting heat of the fluorine-containing olefin polymer being 59 mJ/mg or lower. The light blocking coating layer is made of a resin primarily containing a polyamide resin, the content of polyamide resin-derived monomers and oligomers being 1.5% by weight or lower.

6 Claims, 1 Drawing Sheet

PLASTIC OPTICAL FIBER CABLE

This Application is the U.S. National Phase Application under 35 U.S.C. 371 of PCT International Application PCT/JP2006/309329 filed May 9, 2006, claims the benefit and foreign priority rights from Japanese Application No. 2005-136655, filed May 9, 2005 and from Japanese Application No. 2005-203 171, filed Jul. 12, 2005, and the complete disclosures of each of the aforesaid applications is incorporated herein by reference.

TECHNICAL FIELD

The present invention relates to a plastic optical fiber cable, and particularly to a plastic optical fiber cable with excellent long-term heat resistance in a high-temperature environment approximately at 100 to 125° C.

BACKGROUND ART

Conventional optical fibers made of quartz, having a capability of excellent optical transmission across a broad wavelength spectrum, have been in practical use mainly for trunk lines. The quartz optical fibers, however, are expensive and poor in workability. Therefore, plastic optical fibers (hereinafter abbreviated as POF), which are less inexpensive, have lighter weight, larger apertures, and easily workable end surfaces, are easily handled, and have other advantages, have been in practical use in a lighting application, a sensor application, and an interior wiring application, such as FA, OA and LAN.

Among various POFs, a step-index (SI) POF having a core/clad structure using polymethyl methacrylate (PMMA) as the core material and a low refractive-index fluorine-containing olefin copolymer as the clad material has gradually been in practical use in the form of a POF cable having coating layers on the outer surface of the POF. Such a POF cable is used as in-vehicle LAN communication wiring from the viewpoint of the capability of high-speed data communication, lighter weight, cost reduction in communication systems, excellent anti-electromagnetic noise measures and the like.

When used in an automobile where the ambient temperature reaches approximately 100 to 125° C., such a POF cable is required to excel in heat resistance. In particular, when installed in a high-temperature environment, for example, in the vicinity of the engine where there are oil, electrolyte, and flammable substances, such as gasoline, the POF cable is required to excel not only in heat resistance but also in chemical resistance. There have therefore been proposed many technologies in which polyamide resins, such as nylon 11, nylon 12 and nylon 612, which excel in heat resistance, chemical resistance and the like, are used as the coating material on the POF cable.

For example, Patent Document 1 (Japanese Patent Laid-Open No. 11-101915), Patent Document 2 (Japanese Patent Laid-Open No. 2001-324626), and Patent Document 3 (Japanese Patent Laid-Open No. 2002-148451) propose POF cables using PMMA as the core material, a vinylidene fluoride (VdF) copolymer having a specific composition providing low crystallizability as the clad material, and nylon 12 resin as the coating material.

Patent Documents 1 and 2 disclose POF cables, the transmission loss of which increases approximately by 5 to 6 dB/km after 1000-hour storage in an environment at 105° C., showing excellent heat resistance in the fixed period. Patent Document 3 discloses a POF cable, the transmission loss of which increases approximately by 7.7 to 26 dB/km after 500-hour storage in an environment at 85° C.

Polyamide resins, such as nylon 12 used as the coating material in the POF cables described in Patent Documents 1 to 3, are industrially obtained through a condensation polymerization reaction between amine and carboxylic acid. However, the produced polymer contains monomers and oligomers derived from the polyamide resin raw material, due to chemical equilibrium. In the configuration in which the POF is in close contact with the coating layer made of a polyamide resin, like the POF cable described in Patent Documents 1 to 3, these monomers and oligomers dissolve and diffuse into the POF in a high-temperature environment, resulting in increase in transmission loss. In particular, when the outermost layer of the clad is made of a fluorine-containing olefin resin and contains a tetrafluoroethylene (TFE) unit as well as at least one of a vinylidene fluoride (VdF) unit and a hexafluoropropylene (HFP) unit, the transmission loss significantly increases.

Examples of the polyamide resin raw material-derived monomers are aliphatic diamino acid compounds, aliphatic dicarboxylic acid compounds, and amino-aliphatic carboxylic acid compounds that form polyamide resins, specifically, 11-aminoundecanoic acid for nylon 11, 12-aminododecanoic acid for nylon 12, hexamethylene diamine and a dodecanedioic acid salt for nylon 612, hexamethylene diamine and a sebacic acid salt for nylon 610, ε-animocaproic acid for nylon 6, hexamethylene diamine and adipic acid for nylon 66, 1,10-decanediamine and 1,12-dodecanediamine for nylon 1010, and 1,12-decanediamine and 1,12-dodecanedioic acid for nylon 1012. Another example is cyclic lactam compounds having an endocyclic amide bond (—CONH—) obtained through intramolecular cyclic esterification of the molecular chain terminals of an aminocarboxylic acid compound. Specific examples are ε-caprolactam for nylon 6 and ω-laurolactam for nylon 12. It is noted that the raw material-derived monomers also include low-molecular-weight compounds produced as by-products during raw material synthesis.

On the other hand, examples of the oligomers include compounds obtained in the course of the condensation polymerization reaction for manufacturing the polyamide resin in which the molecular chain terminals of two or more molecules of the raw material monomers described above (such as aliphatic diamino acid compounds, aliphatic dicarboxylic acid compounds, and amino-aliphatic carboxylic acid compounds described above) undergo intermolecular esterification, so that the molecular chain terminal has functional groups, an amino group (—NH$_2$) and/or a carboxyl group (—COOH); cyclic lactam compounds having an endocyclic amide bond (—CONH—) obtained through further intramolecular esterification of the molecular chain terminals of any of the above compounds; compounds obtained through intermolecular esterification of any of the above compounds; and compounds produced through an intramolecular/intermolecular secondary reaction (deamination reaction or decarboxylation reaction).

When the monomers and oligomers described above are linear, the terminal amino group has high affinity with fluorine-containing olefin copolymers, so that the monomers and oligomers likely tend to stay in the clad layer made of the fluorine-containing olefin copolymer. However, when the monomers and oligomers described above are cyclic lactam compounds, the monomers and oligomers move to the vicinity of the interface to the inner layer side of the clad layer (the core or the first clad layer) to form particulate structures, resulting in increase in structure mismatching at the interface to the POF and hence significant degradation in transmission characteristics of the POF cable.

Among the oligomers described above, those having lower molecular weights more likely tend to dissolve and diffuse into the POF. In particular, those having molecular weights of 2000 or lower significantly show such behavior.

When used in an automobile, a POF cable is required to show small increase in transmission loss for a long period, longer than 5000 hours, in an environment at 105° C. However, the POF cables described in Patent Documents 1 to 3, when the POFs are directly coated with polyamide resin, show increase in transmission loss in a high-temperature environment from the reasons described above, so that the POF cables are not good enough to satisfy the requirements.

DISCLOSURE OF THE INVENTION

An object of the present invention is to provide a plastic optical fiber cable (POF cable) that shows small increase in transmission loss and excels in long-term heat resistance in a high-temperature environment.

The present inventors have found that when a polyamide resin is used for a coating layer of a POF cable as described above, monomers and oligomers contained in the polyamide resin are responsible for increase in transmission loss of the POF cable and that a specific structure of the POF cable can prevent the increase in transmission loss, and have attained the present invention.

That is, the present invention includes the following aspects.

(1) A plastic optical fiber cable comprising:
a plastic optical fiber having a core/clad structure; and
a light blocking coating layer provided around the plastic optical fiber,
wherein the outermost layer of the core/clad structure is made of a fluorine-containing olefin polymer containing at least a tetrafluoroethylene unit, the crystal melting heat of the fluorine-containing olefin polymer being 59 mJ/mg or lower;
the light blocking coating layer is made of a resin primarily containing a polyamide resin, the total content of polyamide resin-derived monomer compounds and oligomer compounds being 1.5% by weight or lower; and
the plastic optical fiber cable further comprises a protective coating layer provided between the outermost layer of the core/clad structure and the light blocking coating layer.

(2) The plastic optical fiber cable according to above item (1), wherein the resin that forms the light blocking coating layer contains a terminal amino group, the content of which is 100 μeq/g or lower.

(3) The plastic optical fiber cable according to above item (1) or (2), wherein the miscibility parameter (SP value) of the protective coating layer, SP1, and the miscibility parameter (SP value) of the monomers and oligomers contained in the polyamide resin that is the primary component of the light blocking coating layer, SP2, satisfy the following equation:

$|SP1-SP2| \geq 0.2$.

(4) The plastic optical fiber cable according to any one of above items (1) to (3), wherein the protective coating layer is made of any of a resin containing a methyl (meth)acrylate unit, a resin primarily formed of a styrene unit, a polycarbonate resin, a resin primarily formed of a propylene unit, a resin primarily containing an ethylene-vinyl alcohol copolymer, a polybutylene terephthalate resin, and a polyacetal resin.

(5) The plastic optical fiber cable according to any one of above items (1) to (3), wherein the protective coating layer is made of a resin containing 85 to 97% by weight of a vinylidene fluoride unit.

(6) The plastic optical fiber cable according to any one of above items (1) to (5), wherein the protective coating layer is made of a resin containing a copolymer unit having at least one of an acid anhydride group, a carboxylic acid group, and a glycidyl group.

The present invention can provide a plastic optical fiber cable that significantly excels in long-term heat resistance in a high-temperature environment.

BEST MODE FOR CARRYING OUT THE INVENTION

A core, a clad, a light blocking coating layer, and a protective coating layer that form the POF cable of the present invention will be described below one by one.

Figure 1:
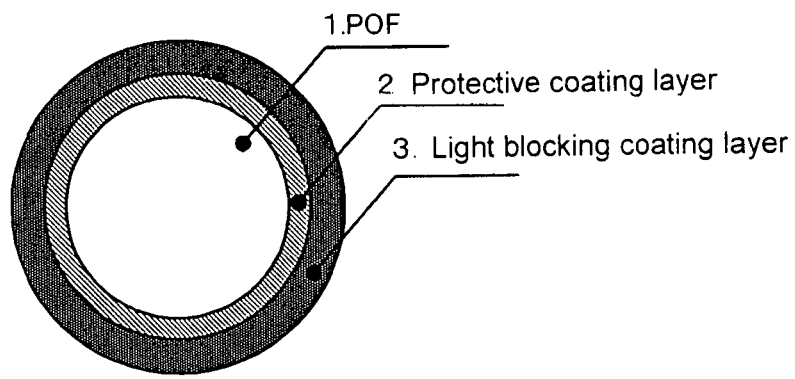
FIG. 1 is a cross-sectional view of a plastic optical fiber cable in accordance with an embodiment of the present invention.

A POF cable in accordance with an embodiment of the present invention includes, as shown in FIG. 1, a plastic optical fiber (POF) 1 formed of a core and at least one clad layer formed around the core (core/clad structure), a protective coating layer 2 provided on the outer surface of the POF 1, and a light blocking coating layer 3 provided on the outer surface of the protective coating layer 2.

Although the material that forms the core of the POF cable of the present invention (core material) is not limited to a specific one, a polymethyl methacrylate (PMMA) or a copolymer of a methyl methacrylate (MMA) unit and at least one vinyl monomer unit (hereinafter referred to as a PMMA resin) is preferable from the viewpoint of satisfactory long-term heat resistance of the POF cable around 100 to 105° C. Among those polymers, PMMA is particularly preferable because it has an excellent balance between transparency and mechanical strength. When the core material is a copolymer of MMA and a vinyl monomer, the content of the MMA unit is preferably 50% by weight or higher, more preferably 60% by weight or higher, even more preferably 70% by weight or higher, from the viewpoint of providing enough transparency. As a copolymerization component for the MMA, any of the materials that have been proposed as the raw material of the POF core material, such as methacrylic ester and acrylic ester, can be selected as appropriate.

When the POF cable is used in a high-temperature environment above 105° C., a polycarbonate resin or a cyclic polyolefin resin, which have high transparency, high Tg, and excellent heat resistance, may be used as the core material. Well known polycarbonate resins and cyclic polyolefin resins can be used.

The clad formed on the outer surface of the core may be formed of one layer or two or more layers. At least the outermost layer of the clad, however, needs to satisfy various requirements, such as mechanical properties, heat resistance, excellent chemical and impact resistance, for functioning as the protective material for the core and the inner clad. Furthermore, in an optical sense, the outermost layer needs to have a refractive index that is low enough to lower optical loss when the POF cable is bent. It is therefore necessary to use a fluorine-containing olefin polymer containing at least tetrafluoroethylene (TFE) unit and having a crystal melting heat of 59 mJ/mg or smaller.

Examples of the fluorine-containing olefin polymer containing a TFE unit are a copolymer obtained through copolymerization of TFE and at least one of vinylidene fluoride (VdF), hexafluoropropylene (HFP), and perfluoro(fluoro)alkylvinyl ether (FVE); a copolymer of a VdF unit, a TFE unit, and a hexafluoroacetone unit; and a copolymer of a TFE unit, an HFP unit, and an ethylene unit, but not limited thereto. As a copolymerization component for TFE, a VdF unit, an HFP unit, or an FVE unit is particularly preferable from the viewpoint of low cost and the fact that a copolymer of a TFE unit and any of the above units has high transparency and excels in heat resistance.

A fluorine-containing olefin polymer containing a TFE unit further containing at least one of a VdF unit and an HFP unit is also preferable in terms of excellent stability during melt spinning of the POF.

Specific examples of the fluorine-containing olefin polymer containing a TFE unit may be a bipolymer of 60 to 90% by weight of a VdF unit and 10 to 40% by weight of a TFE unit; a terpolymer of 10 to 60% by weight of a VdF unit, 20 to 70% by weight of a TFE unit, and 5 to 35% by weight of HFP unit; a terpolymer of 5 to 25% by weight of a VdF unit, 50 to 80% by weight of a TFE unit, and 5 to 25% by weight of an FVE unit, a terpolymer of 5 to 60% by weight of an ethylene unit, 25 to 70% by weight of a TFE unit, and 5 to 45% by weight of an HFP unit, a quaternary polymer of 10 to 30% by weight of a VdF unit, 40 to 80% by weight of a TFE unit, 5 to 40% by weight of an HFP unit, and 0.1 to 15% by weight of an FVE unit; a bipolymer of 40 to 90% by weight of a TFE unit and 10 to 60% by weight of a perfluoro(fluoro)alkylvinyl ether unit; and a bipolymer of 30 to 75% by weight of a TFE unit and 25 to 70% by weight of an HFP unit.

Examples of the FVE unit are compound units expressed by the following general formula (I):

$$CF_2=CF-(OCF_2CF(CF_3))_aO-Rf_2 \tag{I}$$

where $Rf_2$ represents an alkyl group, fluoroalkyl group, alkoxylalkyl group or fluoroalkoxylalkyl group containing 1 to 8 carbon atoms, and a represents an integer ranging from 0 to 3.

Among those expressed by the general formula (I), the FVE unit is preferably any of the compound units expressed by the following general formulae (II) to (V):

$$CF_2=CFO(CF_2)_n-OCF_3 \tag{II}$$

where n represents an integer ranging from 1 to 3, $$CF_2=CF(OCF_2CF(CF_3))_nO(CF_2)_mCF_3 \tag{III}$$

where n represents an integer ranging from 0 to 3, and m represents an integer ranging from 0 to 3, $$CF_2=CFO(CH_2)_n(CF_2)_mCF_3 \tag{IV}$$

where n represents an integer ranging from 1 to 3, and m represents an integer ranging from 0 to 3, $$CF_2=CFO(CH_2)_nCH_3 \tag{V}$$

where n represents an integer ranging from 0 to 3.

Furthermore, at least one compound unit selected from the group consisting of $CF_2=CFOCF_3$, $CF_2=CFOCF_2CF_3$, $CF_2=CFOCF_2CF_2CF_3$, $CF_2=CFOCH_2CF_3$, $CF_2=CFOCH_2CF_2CF_3$, $CF_2=CFOCH_2CF_2CF_2CF_3$, $CF_2=CFOCH_3$, $CF_2=CFOCH_2CH_3$, and $CF_2=CFOCH_2CH_2CH_3$ is preferable as the FVE unit from the viewpoint of the fact that the raw material can be obtained at low cost.

Furthermore, in the present invention, the fluorine-containing olefin polymer that forms the outermost layer of the clad needs to have a crystal melting heat of 59 mJ/mg or smaller, preferably 40 mJ/mg or smaller, more preferably 20 mJ/mg or smaller, even more preferably 15 mJ/mg or smaller. This is because too high crystal melting heat, especially when greater than 59 mJ/mg, increases crystallizability of the resin, and hence reduces transparency of the resin in a high-temperature environment, resulting in increased transmission loss of the POF cable in the initial and high-temperature environments. The resin that forms at least the outermost layer of the clad can be, for example, a resin having a crystal melting heat of 1 mJ/mg or greater, which is within the range describe above.

When the clad is formed of a plurality of layers, the resin that forms the inner-layer clad on the inner layer side of the clad can be selected as appropriate from the materials that have been proposed as the POF clad material, such as fluorinated methacrylate polymer and vinylidene fluoride polymer. A fluorinated methacrylate polymer is particularly preferable because its refractive index is easily adjusted and it has excellent flexibility and workability along with good transparency and heat resistance.

An example of the fluorinated methacrylate polymer having excellent flexibility and workability along with good transparency and heat resistance may be a copolymer of 15 to 90% by weight of unit (A) of a fluorinated alkyl (meth)acrylate expressed by the following general formula (VI) and 10 to 85% by weight of unit (B) of a monomer that can be copolymerized with the monomer of unit (A), the resultant copolymer having a refractive index ranging from 1.39 to 1.475, $$CH_2=CX-COO(CH_2)_m-R1f \tag{VI}$$

where X represents a hydrogen atom, a fluorine atom, or a methyl group, R1f represents a (fluoro)alkyl group containing 1 to 12 carbon atoms, and m represents an integer having a value of 1 or 2.

An example of unit (A) of the fluorinated alkyl (meth)acrylate may be a unit of a compound expressed by the following general formula (VII) or (VIII):

$$CH_2=CX-COO(CH_2)_m(CF_2)_nY \tag{VII}$$

where X represents a hydrogen atom or a methyl group, Y represents a hydrogen atom or a fluorine atom, m represents an integer having a value of 1 or 2, and n represents an integer ranging from 1 to 12, $$CH_2=CX-COO(CH_2)_m-(C)R2fR3fR1 \tag{VIII}$$

where X represents a hydrogen atom or a methyl group, R2f and R3f represent the same fluoroalkyl group or different fluoroalkyl groups, R1 represents a hydrogen atom, a methyl group, or a fluorine atom, and m represents an integer having a value of 1 or 2.

An example of the general formula (VII) may be fluorinated (meth)acrylate having a linear fluorinated alkyl group as a side chain, such as 2,2,2-trifluoroethyl (meth)acrylate (3FM), 2,2,3,3-tetrafluoropropyl (meth)acrylate (4FM), 2,2,3,3,3-pentafluoropropyl (meth)acrylate (5FM), 2,2,3,4,4,4-hexafluorobutyl (meth)acrylate (6FM), 1H,1H,5H-octafluoropentyl (meth)acrylate (8FM), 2-(perfluorobutyl)ethyl (meth)acrylate (9FM), 2-(perfluorohexyl)ethyl (meth)acrylate (13FM), 1H,1H,9H-hexadecafluorononyl (meth)acrylate (16FM), 2-(perfluorooctyl)ethyl (meth)acrylate (17FM), 1H,1H,11H-(icosafluoroundecyl) (meth)acrylate (20FM), and 2-(perfluorodecyl)ethyl (meth)acrylate (21 FM). An example of the general formula (VIII) may be fluorinated (meth)acrylate having a branched fluorinated alkyl group as a side chain, such as hexafluoroneopentyl (meth)acrylate and hexafluoroisobutyl (meth)acrylate.

On the other hand, examples of unit (B) of the monomer that can be copolymerized with the monomer of unit (A) may be alkyl (meth)acrylate, such as methyl (meth)acrylate, ethyl (meth)acrylate, and butyl (meth)acrylate; cycloalkyl (meth) acrylate, such as cyclohexyl (meth)acrylate, methylcyclohexyl (meth)acrylate, bornyl (meth)acrylate, isobornyl (meth)acrylate, and adamantyl (meth)acrylate; aromatic (meth)acrylate, such as phenyl (meth)acrylate and benzyl (meth)acrylate; alicyclic (meth)acrylate having an alicyclic group as a side chain, such as tricyclodecanyl (meth)acrylate, (1-methyltricycloheptyl) (meth)acrylate, and (1-methylhexacyclododecyl) (meth)acrylate; N-substituted maleimide, such as N-methylmaleimide, N-ethylmaleimide, N-propylmaleimide, N-isopropylmaleimide, N-cyclohexylmaleimide, N-phenylmaleimide; γ-butyrolactone compound, such as α-methylene-γ-butyrolactone, α-methylene-γ-methyl-γ-butyrolactone, α-methylene-γ,γ-dimethyl-γ-butyrolactone, α-methylene-γ-ethyl-γ-butyrolactone, α-methylene-γ-cyclohexyl-γ-butyrolactone, α-methylene-β-methyl-γ-butyrolactone, α-methylene-β,β-dimethyl-γ-butyrolactone, α-methylene-β-ethyl-γ-butyrolactone, α-methylene-β-methyl-γ-methyl-γ-butyrolactone, α-methylene-β-methyl-γ,γ-methyl-γ-butyrolactone. From the above compounds, at least one compound having satisfactory transparency and heat resistance as the clad material may be selected as appropriate. Among them, methyl (meth)acrylate is preferable because the transparency and heat resistance as well as the mechanical strength of the clad material can be improved in a well-balanced manner by copolymerizing methyl (meth)acrylate with fluorinated alkyl (meth)acrylate. Furthermore, adding a methacrylic acid unit to a fluorinated methacrylate polymer by 0.5 to 5% by weight can improve adhesion both to the core material and the resin of the clad outermost layer in the POF.

Although the clad layer may be formed of two or more layers as described above, only a first clad as an inner layer clad is preferably provided between the outermost layer clad and the core from the viewpoint of manufacturing cost reduction, so that the clad layer has a two-layer structure including the first clad and a second clad layer as the outermost layer clad on the outer surface of the first clad.

When the clad has the two-layer structure, the refractive index of the core n1, the refractive index of the first clad n2, and the refractive index of the outermost layer clad (second clad) n3 preferably satisfy the following equation (1) from the viewpoint of reduction in bending loss when the POF is bent.

$$n1 > n2 > n3 \quad (1)$$

Alternatively, the following equations (2) and (3) may be satisfied.

$$n1 > n2 \quad (2)$$

$$n2 < n3 \quad (3)$$

It is noted that the refractive index in the present invention is the refractive index measured at 25° C. using the sodium D line.

The light blocking coating layer, which is a component of the POF cable of the present invention, will be described.

The POF cable of the present invention has at least one light blocking coating layer disposed around the POF formed of the core/clad structure described above. The light blocking coating layer contains a light blocking agent, such as carbon black, to prevent incidence of ambient light.

At least one layer of the light blocking coating layers is made of a polyamide resin that excels in heat resistance, bending resistance, chemical resistance and the like.

Examples of the polyamide resin may be homopolymers, such as nylon 10, nylon 11, nylon 12, nylon 6, and nylon 66; copolymers obtained by combining the component units of the above homopolymers, such as nylon 612, nylon 1010, and nylon 1012; and nylon elastomers into which a soft segment is introduced. One of these resins may be used alone, or two or more of them may be combined for use. Alternatively, polymers or compounds other than the polyamide resins may be added as required for use. When other components, such as other polymers or compounds, are thus mixed, the amount of the other components to be added is preferably 50% by weight or smaller. That is, the resin that forms the light blocking coating layer in the present invention primarily contains a polyamide resin, the content of which is preferably 50% by weight or greater, more preferably 70% by weight or greater, even more preferably 80% by weight or greater.

Among the polyamide resins described above, resins made of nylon 11, nylon 12, nylon 612 or combinations thereof have good formability in the coating process and a moderate melting point, so that the POF can be easily coated without reducing the transmission performance of the POF. These resins also excel in adhesion to the POF and dimensional stability and are hence preferable because thermal shrinkage and pistoning, which are problematic particularly when the POF cable is used for an in-vehicle LAN application, can be efficiently eliminated. It is noted that the adhesion between the POF and the light blocking coating layer in the present invention specifically means that the light blocking coating layer is in close contact with the protective coating layer provided around the POF, which will be described later.

In the POF cable of the present invention, to further enhance the long-term heat resistance of the POF cable, the light blocking coating layer needs to be made of a resin primarily made of a polyamide resin, and the total content of polyamide resin-derived monomer and oligomer compounds contained in the resin needs to be 1.5% by weight or lower. The total content of the monomer and oligomer compounds is preferably 1.3% by weight or lower, more preferably 1.0% by weight or lower, most preferably 0.8% by weight or lower. If the content of the monomer and oligomer compounds are too high, particularly greater than 1.5% by weight, the protective coating layer cannot sufficiently block the monomer and oligomer compounds. When the total content of the monomer and oligomer compounds in the light blocking coating layer is within the range described above, the protective coating layer sufficiently block the monomer and oligomer compounds. For example, even when the total content is 0.1% by weight or higher, or even 0.5% by weight or higher, a sufficient blocking effect is provided.

Examples of the monomer compounds in the polyamide resin that forms the light blocking coating layer include, as described above, aliphatic diamino acid compounds, aliphatic dicarboxylic acid compounds, and amino-aliphatic carboxylic acid compounds that form the polyamide resin, as well as by-products produced during manufacture of the polyamide resin, such as cyclic lactam compounds having an endocyclic amide bond (—CONH—) obtained through intramolecular cyclic esterification of the molecular chain terminals of an aminocarboxylic acid compound. Examples of the oligomer compounds in the polyamide resin that forms the light blocking coating layer include, as described above, compounds obtained in the course of the condensation polymerization reaction for manufacturing the polyamide resin in which the molecular chain terminals of two or more molecules of the raw material monomers described above (such as aliphatic diamino acid compounds, aliphatic dicarboxylic acid compounds, and amino-aliphatic carboxylic acid compounds described above) undergo intermolecular esterification, so that the molecular chain terminal has functional groups, an amino group (—NH$_2$) and/or a carboxyl group (—COOH); cyclic lactam compounds having an endocyclic amide bond (—CONH—) obtained through further intramolecular esterification of the molecular chain terminals of any of the above compounds; compounds obtained through intermolecular esterification of any of the above compounds; and compounds produced through an intramolecular/intermolecular secondary reaction (deamination reaction or decarboxylation reaction). Since the oligomers having lower molecular weights more likely tend to dissolve and diffuse into the POF, in particular, those having molecular weights of 2000 or lower significantly show such behavior. The total content of the oligomer and monomer compounds having molecular weights of 2000 or lower is therefore preferably 1.5% by weight or lower.

Examples of a method for reducing the amount of monomer and oligomer compounds in a polyamide resin may be well-known technologies, such as a method for controlling the temperature, the moisture percentage, the raw material/product concentration in the reaction system during the polyamide resin condensation polymerization reaction; a method in which the polymerized polyamide resin is supplied to a hot-water extraction column and then undergoes hot-water counter-current extraction; and a method for demonomerizing the melted polyamide resin in a high-temperature, high-vacuum environment.

In the POF cable of the present invention, to further enhance the long-term heat resistance of the POF cable at a temperature of 100° C. or higher, the resin that forms the light blocking coating layer preferably primarily contains a polyamide resin, and the content of a terminal amino group in the polyamide resin is preferably 100 µeq/g or lower, more preferably 30 µeq/g or lower, even more preferably 10 µeq/g or lower.

Examples of a specific approach for reducing the content of a terminal amino group to 100 µeq/g or lower include methods for reducing remaining raw material-derived monomers, oligomers and the like by capping the terminal portions of the polymer chains of the polyamide polymer, optimizing the manufacturing conditions (the polymerization process and the extraction process), and performing reflux extraction on the polyamide polymer in a low molecular weight alcohol. However, smaller content of a terminal amino group tends to reduce the adhesion between the protective coating layer and the light blocking coating layer. It is therefore necessary to select the material in consideration of the balance between the heat resistance and the adhesion. An example of the polyamide resin with reduced content of a terminal amino group described above is Daiamide-L1600 and L1640 (model names) manufactured by Daicel-Degussa Ltd.

One of the characteristics of the POF cable of the present invention is the protective coating layer provided between the POF and the light blocking coating layer to block the raw material-derived monomer compounds and/or oligomer compounds contained in the polyamide resin that forms the light blocking coating layer from moving into the POF.

The resin that forms the protective coating layer preferably satisfies the following equation:

$$\Delta SP \geq 0.2$$

where $\Delta SP$ is the absolute value of the difference between SP values, $|SP1-SP2|$, $SP1$ is the miscibility parameter (SP value) of the protective coating layer, and $SP2$ is the miscibility parameter (SP value) of raw material monomers of the polyamide resin that forms the light blocking coating layer and oligomers formed from the raw material monomers. The $\Delta SP$ more preferably satisfies the following equation:

$$2.5 \geq \Delta SP \geq 0.5.$$

The $\Delta SP$ even more preferably satisfies the following equation:

$$2.2 \geq \Delta SP \geq 0.75.$$

When $\Delta SP$ is smaller than 0.2, the miscibility of the monomers and oligomers derived from the polyamide resin that forms the light blocking coating layer with the material of the protective coating layer increases, so that the permeability of the monomers and oligomers tends to increase, possibly resulting in an insufficient blocking effect of the protective coating layer.

The miscibility parameter (SP value) represents the solubility parameter of the compound and is a measure indicative of how well an object dissolves. Various calculation methods have been proposed, and the Fedors method (see "Polymer Engineering and Science," Vol. 14, pp. 147-154) was employed in the present invention. According to this method, the miscibility parameter $SP2$ of raw material monomers of the polyamide resin that forms the light blocking coating layer or oligomers formed from the raw material monomers ranges from 10.6 to 11.5.

Preferable specific examples of the resin that forms the protective coating layer are a resin containing a methyl (meth)acrylate unit ($\Delta SP=0.8$ to 2.0), a resin containing a methyl (meth)acrylate unit and a fluorinated alkyl (meth)acrylate unit ($\Delta SP=0.9$ to 2.2), a resin primarily formed of a styrene unit ($\Delta SP=0.9$ to 1.6), a polycarbonate (PC) resin ($\Delta SP=1.7$ to 2.0), a resin primarily formed of a propylene unit and/or a polyethylene unit ($\Delta SP=2.3$ to 2.9), a resin primarily containing an ethylene-vinyl alcohol copolymer ($\Delta SP=4.0$ to 6.2), a polybutylene terephthalate resin ($\Delta SP=0.2$ to 2.0), a polyacetal resin ($\Delta SP=0.7$ to 0.9), and a resin primarily formed of a vinylidene fluoride unit ($\Delta SP=3.1$ to 4.2) from the viewpoint of an excellent monomer/oligomer blocking effect and excellent heat resistance. The resin primarily formed of a methyl (meth)acrylate unit preferably contains at least 50% by weight of a methyl (meth)acrylate unit, more preferably at least 60% by weight. The resin primarily formed of a vinylidene fluoride unit preferably contains 85 to 97% by weight of a vinylidene fluoride unit, more preferably 90-97% by weight.

Various resins that can be preferably used for the protective coating layer of the POF cable of the present invention will be described below.

Well-known resins can be used as the methyl (meth)acrylate unit-containing resin that forms the protective coating layer. Specific examples are a homopolymer of methyl (meth)acrylate (PMMA) and a copolymer of a methyl (meth)acrylate unit and any other monomer. Preferable examples of a copolymerization component for a methyl (meth)acrylate unit are an ethyl (meth)acrylate unit, an isopropyl (meth)acrylate unit, an n-propyl (meth)acrylate unit, a tert-butyl (meth)acrylate unit, an n-butyl (meth)acrylate unit, other alkyl (meth)acrylate units, and a fluorinated alkyl (meth)acrylate unit expressed by the following general formula (IX):

$$CH_2=CX-COO(CH_2)_m(CF_2)_nY \qquad (IX)$$

where X represents a hydrogen atom or a methyl group, Y represents a hydrogen atom or a fluorine atom, m represents an integer having a value of 1 or 2, and n represents an integer ranging from 1 to 12.

In the above general formula (IX), when the structure of the fluorine-containing alkyl group becomes bulky, the polymerizability during polymerization and heat resistance of the copolymer decrease. The fluorine-containing alkyl group therefore preferably includes 1 to 12 carbon atoms.

More specific examples of the fluorinated alkyl (meth) acrylate expressed by the above general formula (IX) may be fluorinated (meth)acrylate having a linear fluorinated alkyl group as a side chain, such as 2,2,2-trifluoroethyl (meth) acrylate (3FM), 2,2,3,3-tetrafluoropropyl (meth)acrylate (4FM), 2,2,3,3,3-pentafluoropropyl (meth)acrylate (5FM), 2,2,3,4,4,4-hexafluorobutyl (meth)acrylate (6FM), 1H,1H, 5H-octafluoropentyl (meth)acrylate (8FM), 2-(perfluorobutyl)ethyl (meth)acrylate (9FM), 2-(perfluorohexyl)ethyl (meth)acrylate (13FM), 1H,1H,9H-hexadecafluorononyl (meth)acrylate (16FM), 2-(perfluorooctyl)ethyl (meth)acrylate (17FM), 1H,1H,11H-(icosafluoroundecyl) (meth)acrylate (20FM), and 2-(perfluorodecyl)ethyl (meth)acrylate (21FM), as well as fluorinated (meth)acrylate having a branched fluorinated alkyl group as a side chain, such as hexafluoroneopentyl (meth)acrylate and hexafluoroisobutyl (meth)acrylate.

When a methyl (meth)acrylate unit-containing resin contains any of the fluorinated alkyl (meth)acrylate units, it is preferable to form a copolymer containing 10 to 95% by weight of a methyl (meth)acrylate unit and 5 to 90% by weight of a fluorinated alkyl (meth)acrylate unit, more preferably 50 to 90% by weight of a methyl (meth)acrylate unit and 10 to 50% by weight of a fluorinated alkyl (meth)acrylate unit, even more preferably 60 to 90% by weight of a methyl (meth)acrylate unit and 10 to 40% by weight of a fluorinated alkyl (meth)acrylate unit, from the viewpoint of the mechanical strength of the protective coating layer and an excellent effect of preventing monomers and oligomers contained in the polyamide resin from dissolving and diffusing into the POF.

Examples of the copolymerization component for a methyl (meth)acrylate unit other than those described above may be a cycloalkyl (meth)acrylate, such as cyclohexyl (meth)acrylate, methylcyclohexyl (meth)acrylate, bornyl (meth)acrylate, isobornyl (meth)acrylate, and adamanthyl (meth)acrylate; alicyclic (meth)acrylate having any other alicyclic group as a side chain, such as tricyclodecanyl (meth)acrylate, (1-methyltricycloheptyl) (meth)acrylate, (1-methylhexacyclododecyl) (meth)acrylate, tricyclo[5.2.1.0$^{2,6}$]-deca-8-yl (meth)acrylate; aromatic (meth)acrylate, such as phenyl (meth)acrylate and benzyl (meth)acrylate; and an aromatic vinyl compound, including styrene, as well as α-substituted styrene, such as α-methylstyrene and α-ethylstyrene, and substituted styrene, such as fluorostyrene and methylstyrene.

Well-known polycarbonate (PC) resin can be used to form the protective coating layer, and aromatic PC resins are preferable from the viewpoint of heat resistance. More preferable examples are aromatic PC or copolymers thereof obtained by causing a carbonate precursor to react with a bisphenol-containing component containing one or more divalent phenol compounds selected from 2,2-bis(4-hydroxyphenyl)propane (bisphenol A), 2,2-bis(4-hydroxyphenyl)-1,1,1,3,3,3-hexafluoropropane (bisphenol AF), 9,9-bis(4-hydroxyphenyl)fluorene, and 1,1-bis(4-hydroxyphenyl)-1-phenylethane.

Among the above resins, aromatic PC or copolymers thereof obtained by causing a carbonate precursor to react with a bisphenol-containing component containing at least 50% by weight of bisphenol A is particularly preferable in terms of long life of the POF cable in a high-temperature environment.

Various well-known substances can be used as the carbonate precursor, for example, phosgene and diphenyl carbonate.

Examples of the PC resin include model names: Iupilon H3000, H4000, and ODX manufactured by Mitsubishi Engineering-Plastics Corporation, model names: Makrolon 2205, 2405, 2605, and CD2005 manufactured by Bayer Material Science Ltd., model names: Tarflon #1700, #1900, #2200, and MD1500 manufactured by Idemitsu Petrochemical Co., Ltd., model names: Panlite L-1225L, L-1225Y, LV-2225Y, and AD5503 manufactured by Teijin Chemicals Ltd., model name: ST-3000 manufactured by Teijin-Bayer Politec Ltd., model names: Lexan 101R, 121R, 5221C, and OQ1020C manufactured by GE Plastics, and model names: Calibre 301-15, 301-22, and 301-30 manufactured by Sumitomo-Dow Chemical Co., Ltd.

A resin primarily formed of a styrene unit may be used to form the protective coating layer. A resin primarily formed of a styrene unit refers to a resin containing at least 50% by weight of a styrene unit therein, examples of which include styrene homopolymers and copolymers containing at least 50% by weight of a styrene unit. Copolymerization components for a styrene unit may be various monomer components listed above as the copolymerization components for a methyl (meth)acrylate unit.

The resin primarily formed of a propylene unit that forms the protective coating layer is a resin containing at least 60% by weight of a propylene unit, examples of which may be propylene homopolymers, propylene-α-olefin copolymers, and propylene-ethylene copolymers.

The resin primarily formed of a propylene unit described above may be blended with either a block copolymer containing a polymer block (A) primarily formed of at least one vinyl aromatic compound and a polymer block (B) primarily formed of at least one conjugate diene compound, or a block copolymer obtained by adding hydrogen to the above block copolymer. Use of such a resin composition for the protective coating layer not only imparts moderate flexibility to the optical fiber cable but also provides an effect of preventing thermal shrinkage of the optical fiber cable.

Examples of the conjugate diene compound include butadiene, isoprene, 1,3-pentadiene, and 2,3-dimethyl-1,3-butadiene. More specific examples of the block copolymer include styrene-ethylene-butylene-styrene copolymers (SEBS), styrene-butadien-styrene copolymers (SBS), styrene-butadien-butylene-styrene copolymers (SBBS), hydrogenated styrene-butadiene rubber (HSBR), styrene-ethylene-butylene-olefin copolymers (CEBS), and styrene-butadiene rubber (SBR).

Examples of the resin primarily formed of a propylene unit described above include model name: NEWCON manufactured by Chisso Corporation, model name: milastomer manufactured by Mitsui Petrochemical Industries, LTD., model name: Thermorun manufactured by Mitsubishi Chemical Corporation, model name: Sumitomo TPE manufactured by Sumitomo Chemical Co., Ltd., and model name: OREVAC manufactured by Arkema K.K.

The ethylene-vinyl alcohol copolymer (hereinafter abbreviated as an EVAL copolymer) as the resin that forms the protective coating layer is a copolymer containing 20 to 70 mol % of an ethylene unit and 30 to 80 mol % of a vinyl alcohol unit. In particular, those having a melting point of 195° C. or lower, more preferably 180° C. or lower, and a melt flow index, measured at 210° C. and under a load of 5 kgf (49 N), of 25 to 80 g/10 minutes are preferable in terms of an excellent effect of preventing monomers and oligomers contained in the light blocking coating layer described above from dissolving and diffusing into the POF and excellent forming stability of the POF cable.

An EVAL copolymer has significantly high adhesiveness to both the fluorine-containing olefin copolymer that forms the clad outermost layer of the POF and the polyamide resin that forms the light blocking coating layer in the present invention, and hence not only mechanically protects the POF cable but also prevents pistoning in a high-temperature environment. Furthermore, the copolymer has a high oxygen blocking property, and hence prevents increase in transmission loss due to oxidation degradation of the POF in a high-temperature environment.

The EVAL copolymer may contain other thermoplastic resins as long as the amount thereof does not compromise the function of the protective coating layer. In this case, the content of the EVAL copolymer in the resin mixture is preferably 50% by weight or higher. For example, to enhance an effect of blocking water vapor of the protective coating layer, 5 to 80 weight parts of a polyethylene resin, a polypropylene resin or the like can be added to 100 weight parts of the EVAL copolymer.

Examples of the EVAL copolymer include model names: EVAL E105, G156, F104, FP104, EP105, and EU105 manufactured by Kuraray Co., Ltd.

The polybutylene terephthalate resin (hereinafter abbreviated as a PBT resin) as the resin that forms the protective coating layer is a polymer primarily formed of an oligopoly-1,4-butylene terephthalate unit expressed by the following general formula (X):

[Chemical Formula 1]

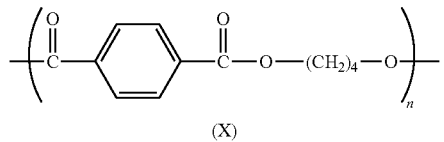

(X)

The oligopoly-1,4-butylene terephthalate is obtained in the following process: an esterification reaction between 1,4-butanediol(tetramethylene glycol) and terephthalic acid or an ester exchange reaction between 1,4-butanediol and dimethyl terephthalate provides bishydroxybutylterephthalate (BHT) or an oligomer thereof, which then undergoes condensation polymerization. Such a PBT resin preferably has a melting point of 195° C. or lower, more preferably 180° C. or lower.

A more specific example of the PBT resin is a resin obtained through block copolymerization between a hard segment unit (crystalline phase) and a soft segment unit (amorphous phase). The hard segment unit is the oligopoly-1,4-butylene terephthalate expressed by the above general formula (X). On the other hand, the soft segment unit is either an aliphatic polyether block unit expressed by the following general formula (X1) obtained through synthetic condensation polymerization between aliphatic polyether having a molecular weight ranging from 200 to 5000 (for example, poly(tetramethylene oxide glycol) (PTMG)) and terephthalic acid or dimethyl terephthalate:

[Chemical Formula 2]

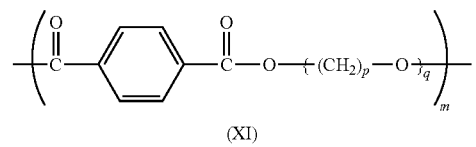

(XI)

where p represents an integer ranging from 4 to 12, and q represents an integer ranging from 1 to 20, or an aliphatic polyester block unit expressed by the following general formula (XII), such as poly(ε-caprolactone) (PCL) and polybutylene adipate (PBA):

[Chemical Formula 3]

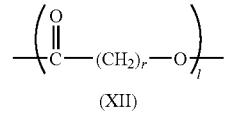

(XII)

The melting viscosity of such a PBT resin around at 190 to 230° C., which is approximately the forming temperature range of the POF cable, can be easily adjusted by adjusting the composition ratio of the hard segment unit to the soft segment unit, or adjusting the molecular weight of the polymer.

Examples of such a PBT resin include model names: Hytrel 2551, 4047, 4057, and 4767 manufactured by Toray-DuPont Co., Ltd., model name: DYURANEX 400LP manufactured by Polyplastics Co., Ltd., model name: NUBELAN 4400 series manufactured by Teijin Chemicals Ltd., model names: PELPRENE S type and P type manufactured by Toyobo Co., Ltd., model name: PRIMALLOY B series manufactured by Mitsubishi Chemical Corporation.

The polyacetal resin (hereinafter abbreviated as a POM resin) that forms the protective coating layer is a polymer primarily formed of an oxymethylene unit (—CH$_2$O—). Examples of the polyacetal resin include homopolymers only formed of an oxymethylene unit obtained through homopolymerization of formaldehyde, and a block copolymer obtained by introducing a polyolefin component into the polyacetal framework obtained through copolymerization between trioxane and cyclic ether (cationic polymerization). These POM resins have an excellent effect of preventing monomers and oligomers contained in the polyamide resin described above from dissolving and diffusing into the POF. Furthermore, since the melting points of the POM resins are typically as low as 180° C. or lower, the POF (core/clad structure) can be coated with any of such POM resins without thermal damage during the POF cable coating process.

Examples of such a POM resin include model names: Tenac 4010, 5010, 7010, 5050, 7054, and 9054, Tenac C 4520, 5520, 7520, and 8520, and HC series manufactured by Asahi Kasei Corporation, model name: DYURACON M450 manufactured by Polyplastics Co., Ltd., and model names: Derlin 900 series and 1700 series manufactured by Du Pont.

When a resin primarily formed of a vinylidene fluoride unit is used as the resin that forms the protective coating layer, it is preferable to use a resin composition containing 85 to 97% by weight of a vinylidene fluoride unit, preferably 90 to 97% by weight.

When the content of a vinylidene fluoride unit is 85% by weight or higher, a sufficient blocking effect of the protective coating layer on monomers and oligomers is provided. When the content is 97% by weight or lower, the melt flow index of the resin is easily adjusted in a desired range, for example, 30 to 80 g/10 minutes.

While various resins described above can be listed as a preferable resin as the material of the protective coating layer of the POF cable of the present invention, the protective coating layer may contain a light blocking agent, such as carbon black, as in the light blocking coating layer, to prevent incidence of ambient light into the POF. To provide a sufficient light blocking effect, the light blocking agent may be added to the extent that it does not compromise the inherent advantageous effect of the protective coating layer. For example, the content of the light blocking agent may be 0.1% or higher.

Furthermore, to further enhance the adhesion between the POF (clad outermost layer) and the protective coating layer as well as the adhesion between the light blocking coating layer (polyamide resin) and the protective coating layer, it is preferable to add an adhesive component containing at least one of an acid anhydride group, a carboxylic acid group, and a glycidyl group into the resin that forms the protective coating layer. For example, at least one monomer selected from (meth)acrylic acid, maleic anhydride, glycidyl (meth)acrylate and the like is used as a copolymerization component for a methyl (meth)acrylate unit or a styrene unit and copolymerized therewith, and the resultant copolymer is used for the light blocking coating layer. Alternatively, a copolymer containing a monomer unit that is the adhesive component described above is added to a resin primarily formed of a methyl (meth)acrylate unit or a styrene unit, a PC resin or the like by the amount necessary to achieve a target adhesion strength, and the resultant resin mixture is used for the light blocking coating layer. In particular, a copolymer obtained through copolymerization of at least one monomer selected from (meth)acrylic acid, maleic anhydride, and glycidyl (meth)acrylate with MMA, or a copolymer obtained through further copolymerization of the above monomers with styrene is desirable in terms of adhesiveness.

The content of the adhesive monomer having an acid anhydride group, a carboxylic acid group, or a glycidyl group in the copolymer used for the protective coating layer is preferably 5% by weight or lower, more preferably 3% by weight or lower. When the content is 5% by weight or lower, sufficient flowability is provided when the copolymer is melted in a conjugate fiber spinning process or a coating process, allowing stable fiber spinning or coating, and preventing foaming when the copolymer is melted.

The material of the protective coating layer may be a resin obtained through copolymerization using not only any of the adhesive monomer components described above but also at least one copolymerizable component selected from alkyl (meth)acrylate, such as ethyl (meth)acrylate and butyl (meth)acrylate; fluoroalkyl (meth)acrylate, such as trifluoroethyl (meth)acrylate and tetrafluoropropyl (meth)acrylate; alicyclic (meth)acrylate, such as cyclohexyl (meth)acrylate; and aromatic (meth)acrylate, such as benzyl (meth)acrylate, to the extent that desired material properties are not compromised.

Use of a resin containing an adhesive component for the protective coating layer as described above enhances the adhesion between the POF and the protective coating layer as well as the adhesion between the protective coating layer and the light blocking coating layer, and hence enhances the pullout strength (that is, the pullout strength between the POF and the light blocking coating layer) to 25 N or greater, or even 35 N or greater. When the pullout strength between the POF and the light blocking coating layer is 25 N or greater, it is possible to further prevent pistoning in a high-temperature environment. When one end of the POF cable is fixed to a plug, through which the POF cable is connected to any other apparatus, an excessive force caused by a mechanical action, such as vibration, may act on the POF and break it when the adhesion between the POF and the light blocking coating layer is insufficient. The present invention can prevent such breakage.

The glass transition temperature of any of the various materials of the protective coating layer described above is preferably 70° C. or higher but 160° C. or lower, more preferably 75° C. or higher but 120° C. or lower. When the glass transition temperature is 70° C. or higher, the protective coating layer provides a sufficient blocking effect even when the POF cable is used around at a temperature ranging from 100 to 105° C. When the glass transition temperature is 160° C. or lower, there is provided sufficient adhesion strength between the POF and the protective coating layer and/or sufficient adhesion strength between the protective coating layer and the light blocking coating layer. It is therefore possible to prevent pistoning even when the POF cable is used in a high-temperature environment.

The thickness of each of the layers that form the POF cable of the present invention will be described below. The diameter of the POF having the core/clad structure is preferably on the order of 500 to 1500 μm, and the thickness of the clad is preferably on the order of 2 to 30 μm. The thickness of the protective coating layer provided around the POF is preferably on the order of 5 to 300 μm, more preferably 20 to 200 μm. When the thickness of the protective coating layer is 5 μm or greater, it is easy to perform extrusion coating around the POF in a uniform manner and sufficient pullout strength can be maintained. Even when the thickness is greater than 300 μm, it is difficult to provide a blocking effect of the protective coating layer greater than that of the protective coating layer having a thickness of 300 μm. The thickness of the light blocking coating layer preferably ranges from 100 to 1000 μm, more preferably 100 to 600 μm. When the thickness of the light blocking coating layer is 100 μm or greater, a sufficient light blocking effect is provided. Even when the thickness is greater than 1000 μm, it is difficult to provide a greater light blocking effect than that obtained when the thickness is 1000 μm.

The POF cable of the present invention may be configured in such a way that a plurality of coating layers are further formed around the light blocking coating layer. For example, by coating the outer surface of the light blocking coating layer using a polyamide resin with a polyamide resin having properties different from those of the polyamide resin used for the light blocking layer or a thermoplastic resin other than polyamide resins, it is easy to impart a plurality functions, which cannot be achieved through one coating layer, to the POF cable. Specifically, to impart fire resistance to the POF cable, a resin having excellent fire resistance (such as a vinyl chloride resin) may be used for the outermost layer of the coating layers. By using a more flexible resin for the outermost layer of the coating layers to further improve the flexibility of the POF cable, the POF cable can be more easily reshaped into its original shape, allowing improvement in handling. Examples of the thermoplastic resin other than polyamide resins may be polyolefin resins, such as polyethylene resins and polypropylene resins, crosslinked polyethylene resins, crosslinked polypropylene resins, vinyl chloride resins, chlorinated polyethylene resins, polyurethane resins, fluorine resins, ethylene-vinyl acetate copolymers, polyimide resins, and polyester resins. A mixture of one or more of the above resins can be used.

Among these resins, at least one of a crosslinked polyethylene resin, a crosslinked polypropylene resin, and a polyvinylidene fluoride resin is preferably used to further form a coating layer around the light blocking coating layer made of a polyamide resin from the viewpoint of a satisfactory long-term heat resistance of the POF cable of the present invention at 100 to 105° C.

To enhance the identity and the exterior design of the POF cable, a colorant may be added to the material that forms the outermost layer of the coating layers. Although well-known dye-based colorants and inorganic colorants can be used, inorganic pigments are preferably used from the viewpoint of heat resistance.

To impart fire resistance to the POF cable, a fire retardant may be added to the coating material. The fire retardant can be well-known ones, such as metal hydroxides, phosphorus compounds, and triazine compounds. When a polyamide resin is used as the primary component of the coating material, the fire retardant is preferably a triazine compound, particularly preferably melamine cyanurate.

Two representative examples of the method for manufacturing the POF cable of the present invention will be described below. Either of these manufacturing methods may be used as appropriate according to the flowability of the material to be used and the specifications of the apparatus to be used.

In a first method, the POF cable is provided by performing conjugate fiber spinning of a core, at least one layer of clad formed around the core, and a protective coating layer formed around the clad to form the POF integral with the protective coating layer, and using a coating apparatus with a crosshead die to form a light blocking coating layer around the protective coating layer. This method is effective when a protective coating layer having a thickness of 50 μm or smaller is provided around the POF. In this case, when the melt flow index (MI) of the resin used for the protective coating layer, measured in compliance with ISO-62 (the amount (g) of polymer ejected from a nozzle having a diameter of 2 mm and a length of 8 mm in 10 minutes at a temperature of 230° C. and under a load of 5 kgf), is too small, the forming stability during the coating layer formation may decrease and the pressure from the resin on the POF in the crosshead increases, so that the optical properties of the POF cable may be degraded. On the other hand, when the melt flow index is too large, the mechanical strength of the protective coating layer tends to decrease. In consideration of these factors, the MI of the resin for the protective coating layer preferably ranges from 10 to 100, more preferably 20 to 80. It is also preferable that the MIs of the materials of the core, the clad, and the protective coating layer, MI1, MI2 and MI3, satisfy the following equation (4) from the viewpoint of good stability during the conjugate fiber spinning:

$$MI1 > MI2 > MI3 \tag{4}$$

The fiber spinning temperature during the conjugate fiber spinning preferably ranges from 220° C. to 260° C., more preferably 220° C. to 240° C. The temperature of the crosshead die preferably ranges from 190° C. to 230° C., more preferably 200° C. to 220° C.

In a second method, after a POF including a core and at least one layer of clad formed around the core is formed in advance through conjugate fiber spinning, a coating apparatus using a crosshead die is used to coat a protective coating layer and a light blocking coating layer at the same time around the POF through co-extrusion. This method is effective when in a heated drawing process carried out to impart toughness to the POF, the protective coating layer integrally drawn with the POF may be damaged because the glass transition temperature and/or the melting point of the core material resin and the clad material resin of the POF is lower than the glass transition temperature and/or the melting point of the protective coating layer. Specifically, this is the case when the core material of the POF is made of polymethyl methacrylate and the protective coating layer is made of a polycarbonate resin. In this case, when the melt flow index of the resin used for the protective coating layer (MI3) (the amount (g) of polymer ejected from a nozzle having a diameter of 2 mm and a length of 8 mm in 10 minutes at a temperature of 210° C. and under a load of 5 kgf) is too small, the forming stability during the coating layer formation may decrease because the viscosity of the resin increases, and the pressure from the resin on the POF in the crosshead increases when the POF is coated with the protective coating layer and the light blocking coating layer through co-extrusion, resulting in possible damage on the POF. On the other hand, when the melt flow index is too large, providing a protective coating layer with a uniform thickness having a fixed value or smaller tends to be difficult, and the protective coating layer tends to be broken when the POF cable is bent. In consideration of these factors, the MI3 preferably ranges from 20 to 200, more preferably 30 to 150, even more preferably 50 to 100. It is also preferable that the following equation (5) is satisfied from the viewpoint of good stability during the co-extrusion $$MI3 \geq MI4 \tag{5}$$

where MI4 is the melt flow index of the material of the light blocking coating layer. The fiber spinning temperature during the co-extrusion preferably ranges from 200° C. to 260° C., more preferably 220° C. to 240° C. The temperature of the crosshead die preferably ranges from 210° C. to 240° C., more preferably 215° C. to 225° C.

To keep the melt flow index of the resin that forms the protective coating layer (MI3) within the above numerical range, the molecular weight of the resin may be adjusted, or an appropriate melting viscosity adjuster may be added to the resin. Specifically, a resin primarily containing methyl (meth) acrylate having a low molecular weight (Mn=2000 to 10000) is added to a resin primarily formed of a methyl (math) acrylate unit having a high molecular weight, or a phthalate compound, such as dioctyl phthalate and dimethyl phthalate, is added as a plasticizer. However, the method for reducing the melt flow index is not particularly limited to these methods.

EXAMPLES

The present invention will be described below with reference to Examples. Various evaluations conducted on each Example of the present invention were performed according to the following methods. Table 1 shows the configurations of the POF cables used in the evaluations, and Table 2 shows the evaluation results.

[Measurement of Crystal Melting Heat: ΔH]

A differential scanning calorimeter (DSC) (Seiko Instruments Inc., Model Name: DSC-220) was used. After each sample was heated at a temperature rising rate of 10° C./min to 200° C., held at 200° C. for 5 minutes and melted, the sample was cooled at a rate of 10° C./min to 0° C., followed by another heating process at a temperature rising rate of 10°

C./min, 5-minute holding, and another cooling process at a rate of 10° C./min. The crystal melting heat (ΔH) at this point was measured.

[Measurement of Refractive Index]

A melt press machine was used to form a film-like specimen piece having a thickness of 200 μm. An Abbe refractometer was used to measure the refractive index at room temperature (23° C.) using the sodium D line ($_nD_{23}$).

[Measurement of Melt Flow Index]

The melt flow index (MI) was measured in compliance with JIS (Japanese Industrial Standard) K7210. The amount of polymer ejected from a nozzle having a diameter of 2 mm and a length of 8 mm in 10 minutes was measured at a temperature of 210° C. (or 230° C.) and under a load of 5 kgf (49 N).

[Methods for Quantitative Analysis and Qualitative Analysis of Low Molecular Weight Compounds (Monomer Compounds and Oligomer Compounds) in Polyamide Resin]

A 50 g pellet of polyamide resin and 100 ml of methanol were put in a 300 ml piriform flask, stirred and refluxed for 24 hours. After the reflux, the methanol was transferred into a beaker, and new methanol was put into the piriform flask, and refluxed for another 24 hours. After the reflux, the total amount of 200 ml of the extracted methanol solution was dried, and the weight of the resultant dried product was measured (X g). A mass spectrometer (MS) (JOEL Ltd., Model Name: SX-102) and Thermal Desorption GC-MS (Agilent, Model Name: HP5890/5972) were used to carry out qualitative analysis of the dried product.

An appropriate amount of the dried product was dissolved again in methanol, and a preparative size exclusion chromatography (SEC) (Japan Analytical Industry, Co., Ltd., Model Name: LC-10) was used to recover the dried product on a molecular weight basis. Furthermore, a nuclear magnetic resonance spectroscopic measurement (NMR) (JOEL Ltd., Model Name: EX-270) was used to carry out a qualitative analysis on the recovered product.

The content of the monomer and oligomer compounds contained in the polyamide resin pellet was calculated by using the following equation:

[Content]=X/50×100(% by weight)

[Measurement of Transmission Loss]

A 25-1m cut-back method was used to measure transmission loss of the POF and the POF cable by using light having a measurement wavelength of 650 nm under the condition of NA of excitation light=0.1.

[Method of Heat Resistance Test]

POF cables were left in an oven at 105° C. for 5000 hours.

[Measurement of Terminal Amino Group Concentration]

The terminal amino group concentration (μeq/g) of the polyamide resin was measured by dissolving the polyamide resin in a phenol/methanol (volume ratio: 10/1) mixture solvent and performing neutralization titration by using potentiometric titration with 0.01 N—HCl.

[Measurement of Pullout Strength of Coating Layer]

Figure 2:
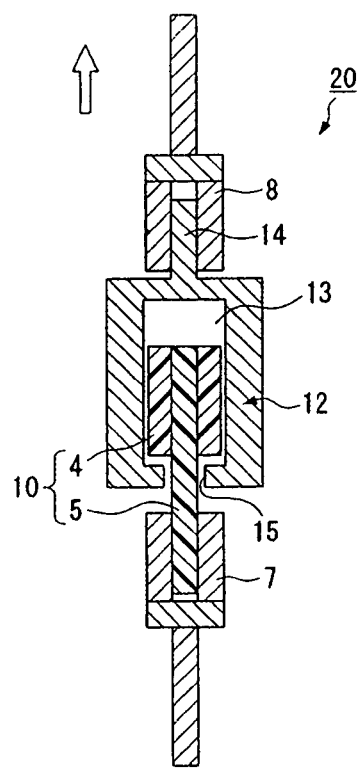
FIG. 2 is a sectional view showing how to measure the pullout strength of a coating layer.

The pullout strength between each POF and its light blocking coating layer was measured, as shown in FIG. 2, by using a measurement apparatus 20 including a fixture 12 that holds a POF cable 10, a chuck 8 that grips a protrusion 14 formed on one end of the fixture 12, and a chuck 7 that grips a stripped portion 5 of the POF cable 10. The fixture 12 has a holding chamber 13 that accommodates a coating portion 4 of the POF cable 10 and a through hole 15 that is larger than the stripped portion 5 of the POF cable 10 but narrower than the coating portion 4.

For the measurement, the light blocking coating layer on one end of a prepared POF cable was stripped, and the POF cable was cut in such a way that the length of the light blocking coating portion 4 of the POF cable is 30 mm. Then, the light blocking coating portion 4 of the POF cable was put in the holding chamber 13 formed in the fixture 12, and the stripped portion 5 of the POF cable was pulled out of the through hole 15. Next, the chuck 8 was used to grip the protrusion 14 formed on the one end of the fixture 12, and the chuck 7 was used to grip the stripped portion 5 of the POF cable.

Then, the chuck 8 was moved along the central axis direction of the POF cable 10 (in the direction indicated by the arrow in the figure) at a fixed rate of 50 mm/min to pull the fixture 12, and the portion thicker than the stripped portion 5 in the coating portion 4 of the POF cable 10 was pulled out. The curve indicative of the relationship between the pullout stress during the pulling action and the pullout-direction shift of the portion thicker than the stripped portion 5 in the coating portion 4 of the POF cable 10 was used to read the peak value of the stress during the pulling action, and the readout was defined as the pullout strength.

Comparative Example 1

PMMA (refractive index: 1.492) was used for the core material. A copolymer (refractive index: 1.416 to 1.417) of 3FM/17FM/MMA/MAA (composition ratio: 51/31/17/1 (% by weight)) was used for the first clad material. A copolymer of VdF/TFE/HFP (composition ratio: 43/48/9 (% by weight), refractive index: 1.375, crystal melting heat (ΔH): 14 mJ/mg) was used for the second clad material. These polymers were melted, supplied to a spinning fiber head at 220° C., and underwent a conjugate fiber spinning process by using concentric conjugate nozzles. Then, in a hot air furnace at 140° C., the resultant fiber was drawn to be twice in length in the fiber axis direction. A 1 mm-diameter POF in which the thickness of each of the clads was 10 μm was thus provided.

The transmission loss of the resultant POF was as good as 134 dB/km, and the transmission loss after the heat-resistance test was also as good as 185 dB/km.

The outer surface of the fabricated POF was coated with a commercially available nylon 12 resin (EMS-Showa Denko, Model Name: Grilamide L16A) as the light blocking coating layer in a crosshead cable coating apparatus using a crosshead die set at 210° C. The nylon 12 resin, to which 1% by weight of carbon black was added, had a terminal amino group concentration of 120 μeq/g. A POF cable having an outer diameter of 1.5 mm (the thickness of the light blocking coating layer: 250 μm) was thus provided.

The content of monomers and oligomers contained in the nylon 12 resin of the light blocking coating layer was 1.69% by weight. Qualitative analysis performed on the recovered product obtained from the extracted methanol solution revealed that the extract included a monomer (12-aminododecanoic acid and ω-laurolactam), which was the raw material of the nylon 12 resin, as well as the dimmer, trimer, tetramer, and higher-order multimer of that monomer (aminoaliphatic carboxylic acid compounds and cyclic lactam compounds).

Various evaluations were conducted on the resultant POF cable, and the evaluation results are shown in Table 2. Although the resultant POF cable had a good initial transmission loss of 135 dB/km, the transmission loss after the heat resistance test was 1000 dB/km or greater.

Comparative Example 2

A POF cable was fabricated in a way similar to Comparative Example 1 except that a commercially available nylon 12 resin (Daicel-Degussa Ltd., Model Name Daiamide-L1640) was used for the light blocking coating layer. The nylon 12 resin, to which 1% by weight of carbon black was added, had a terminal amino group content of 2 μeq/g or lower. Although the resultant POF cable had a good initial transmission loss of 135 dB/km, the transmission loss after the heat resistance test was 540 dB/km.

The content of monomers and oligomers contained in the nylon 12 resin of the light blocking coating layer was 1.18% by weight. Qualitative analysis performed on the recovered product obtained from the extracted methanol solution revealed that the extract included a monomer (12-aminododecanoic acid and ω-laurolactam), which was the raw material of the nylon 12 resin, as well as the dimmer, trimer, tetramer, and higher-order multimer of that monomer (aminoaliphatic carboxylic acid compounds and cyclic lactam compounds).

Example 1

The cable coating apparatus equipped with a crosshead die set at 210° C. was used to fabricate a POF in a way similar to Comparative Example 1 described above. The outer surface of the POF was coated with a MMA/MAA copolymer (composition ratio: 98/2 (% by weight), melt flow index: 60 g/min) as the protective coating material, and the outer surface of the protective coating was coated with a commercially available nylon 12 resin (Daicel-Degussa Ltd., Model Name: Daiamide-L1640) having a terminal amino group content of 2 μeq/g or lower, to which 1% by weight of carbon black was added. The above coating process was performed through co-extrusion. There was thus provided a POF cable having the protective coating layer (thickness: 60 μm) and the light blocking coating layer (thickness: 190 μm), the outer diameter of the POF cable being 1.5 mm. Various evaluations were conducted on the resultant POF cable, and the evaluation results are shown in Table 2.

Example 2

The same materials as those used in Example 1 were used for the core material, the first clad material, the second clad material, and the protective coating layer. These polymers were melted, supplied to the spinning fiber head at 230° C., and underwent a conjugate fiber spinning process by using the concentric conjugate nozzles. Then, in the hot air furnace at 140° C., the resultant fiber was drawn to be twice in length in the fiber axis direction. A 1 mm-diameter POF in which the thickness of each of the first clad, the second clad, and the protective coating layer was 10 μm was thus provided. The resultant POF had a good initial transmission loss of 134 dB/km. The outer surface of the POF was coated with the same light blocking coating layer as that in Example 1 through co-extrusion. A POF cable having an outer diameter of 1.5 mm was thus fabricated. Various evaluations were conducted on the resultant POF cable, and the evaluation results are shown in Table 2.

Example 3

PMMA (refractive index: 1.492) was used for the core material. A copolymer of VdF/TFE/HFP/PFPVE (composition ratio: 21/55/18/6 (% by weight), refractive index: 1.350, crystal melting heat (ΔH): 8 mJ/mg) was used for the clad material. A MMA/MAA/butylacrylate (BA) copolymer (composition ratio: 88/2/10 (% by weight), melt flow index: 61 g/min) was used for the protective coating layer. A method similar to that used in Example 2 was used to provide a POF having a diameter of 1 mm in which the thickness of each of the clad and the protective coating layer was 10 μm. The resultant POF had a good initial transmission loss of 132 dB/km. The outer surface of the POF was coated with a commercially available nylon 11 resin (Atofina, Model Name: RILSAN BMF-0) as the light blocking coating layer, to which 1% by weight of carbon black was added, in a way similar to Example 2. A POF cable was thus fabricated. Various evaluations were conducted on the resultant POF cable, and the evaluation results are shown in Table 2. The content of monomers and oligomers contained in the nylon 11 resin of the light blocking coating layer was 0.95% by weight.

Examples 4 to 18

Each POF was fabricated in a way similar to Comparative Example 1 except that the material described in Table 1 was used for each clad. The outer surface of the POF was coated with the protective coating layer and the light blocking coating layer trough co-extrusion in a way similar to Example 1 except that the material described in Table 1 was used for each protective coating layer. A POF cable having an outer diameter of 1.5 mm was thus fabricated. Various evaluations were conducted on the resultant POF cable, and the evaluation results are shown in Table 2.

Comparative Example 3

A POF cable was fabricated in a way similar to Example 7 except that a VdF/TFE copolymer (composition ratio: 80/20 (% by weight), refractive index: 1.402, crystal melting heat (ΔH): 60 mJ/mg) was used for the second clad. Table 2 shows various evaluation results.

Comparative Example 4

A POF cable was fabricated in a way similar to Example 7 except that a commercially available nylon 12 resin (EMS-Showa Denko, Model Name: Grilamide L16A) having a terminal amino group content of 120 μeq/g, to which 1% by weight of carbon black was added, was used for the light blocking coating layer. Table 2 shows various evaluation results.

Comparative Examples 5 and 6

Each POF cable was fabricated in a way similar to Comparative Example 4 except that the material described in Table 1 was used for each second clad and protective coating layer. Table 2 shows various evaluation results.

As apparent from Table 2, the POF cables in Examples 1 to 18 had good initial transmission loss (140 dB/km or smaller). Furthermore, increase in transmission loss after 5000 hours in an environment at 105° C. was small to the extent that there was no practical problem, as compared to the POF cables, each directly coated with the polyamide resin without providing any protective coating layer on the outer surface of the POF (Comparative Examples 1 and 2), the POF cable in which the crystal melting heat of the outermost surface of the clad was greater than 59 mJ/mg (Comparative Example 3), and the POF cables in which the content of the terminal amino group in the light blocking coating layer was large (Comparative Examples 4 to 6).

TABLE 1

| | First Clad Composition (% by weight) | First Clad Refractive Index | Second Clad Composition (% by weight) | Second Clad Refractive Index | ΔH (mJ/mg) | Protective Coating Layer Material (% by weight) | MI (g/10 min) | Light Blocking Coating Layer Material | Difference in Miscibility Parameter (ΔSP) | Method for Forming Protective Coating Layer |
|---|---|---|---|---|---|---|---|---|---|---|
| Com. Ex. 1 | 3FM/17FM/MMA/MAA (51/31/17/1) | 1.417 | VdF/TFE/HFP (48/43/9) | 1.375 | 14 | Not Applicable | — | PA12(b) | — | — |
| Com. Ex. 2 | 3FM/17FM/MMA/MAA (51/31/17/1) | 1.417 | VdF/TFE/HFP (48/43/9) | 1.375 | 14 | Not Applicable | — | PA12(a) | — | — |
| Ex. 1 | 3FM/17FM/MMA/MAA (51/31/17/1) | 1.417 | VdF/TFE/HFP (48/43/9) | 1.375 | 14 | MMA/MAA (98/2) | 60 | PA12(a) | 0.8-0.9 | Co-Extrusion Coating |
| Ex. 2 | 3FM/17FM/MMA/MAA (51/31/17/1) | 1.417 | VdF/TFE/HFP (48/43/9) | 1.375 | 14 | MMA/MAA (98/2) | 60 | PA12(a) | 0.8-0.9 | Conjugate Fiber Spinning |
| Ex. 3 | Not Applicable | | VdF/TFE/HFP/PFPVE (21/55/18/6) | 1.350 | 8 | MMA/MAA/BA (88/2/10) | 61 | PA11 | 1.7-1.8 | Conjugate Fiber Spinning |
| Ex. 4 | 3FM/17FM/MMA/MAA (51/31/17/1) | 1.417 | VdF/TFE/HFP (48/43/9) | 1.375 | 14 | PBT Resin (2) | 45 | PA12(a) | 1.4-1.7 | Co-Extrusion Coating |
| Ex. 5 | 3FM/17FM/MMA/MAA (51/31/17/1) | 1.417 | VdF/TFE/HFP (48/43/9) | 1.375 | 14 | PBT Resin (3) | 44 | PA12(a) | 1.4-1.7 | Co-Extrusion Coating |
| Ex. 6 | 3FM/17FM/MMA/MAA (51/31/17/1) | 1.417 | VdF/TFE/HFP (48/43/9) | 1.375 | 14 | PBT Resin (4) | 22 | PA12(a) | 1.4-1.7 | Co-Extrusion Coating |
| Ex. 7 | 3FM/17FM/MMA/MAA (51/31/17/1) | 1.417 | VdF/TFE/HFP (48/43/9) | 1.375 | 14 | MMA/MAA/17FM (85/1/14) | 45 | PA12(a) | 0.9-1.2 | Co-Extrusion Coating |
| Ex. 8 | 3FM/17FM/MMA/MAA (51/31/17/1) | 1.417 | VdF/TFE/HFP (48/43/9) | 1.375 | 14 | MMA/MAA/BA (93/2/5) | 80 | PA12(a) | 1.2-1.4 | Co-Extrusion Coating |
| Ex. 9 | 4FM/5FM/MMA/MAA (40/50/9/1) | 1.414 | VdF/TFE/TFMVE/MAA (13/67/19/1) | 1.346 | 8 | PC(1)/PC Oligomer/MMA-GMA (60/35/5) | 100 | PA12(a) | 1.7-1.9 | Co-Extrusion Coating |
| Ex. 10 | Not Applicable | | VdF/TFE/HFP/PFPVE (21/55/18/6) | 1.350 | 11 | PC(1)/PC-g-PSt (60/40) | 95 | PA12(a) | 1.7-1.9 | Co-Extrusion Coating |
| Ex. 11 | Not Applicable | | VdF/TFE/HFP (40/40/20) | 1.365 | <5 | PC(1)/PMMA Oligomer (60/40) | 110 | PA12(a) | 1.6-1.8 | Co-Extrusion Coating |
| Ex. 12 | 5FM/17FM/MMA/MAA (30/50/18/2) | 1.401 | VdF/TFE/HFP/PFPVE (21/55/18/6) | 1.350 | 11 | PC(1)/PC Oligomer (60/40) | 120 | PA12(a) | 1.7-1.9 | Co-Extrusion Coating |
| Ex. 13 | 3FM/17FM/MMA/MAA (51/31/17/1) | 1.417 | VdF/TFE/HFP (48/43/9) | 1.375 | 14 | PC(2) | 100 | PA12(a) | 1.7-1.9 | Co-Extrusion Coating |
| Ex. 14 | 3FM/17FM/MMA/MAA (51/31/17/1) | 1.417 | VdF/TFE/HFP (48/43/9) | 1.375 | 14 | EVAL Copolymer (1) | 39 | PA12(a) | 4.4-4.7 | Co-Extrusion Coating |
| Ex. 15 | 3FM/17FM/MMA/MAA (51/31/17/1) | 1.417 | VdF/TFE/HFP (48/43/9) | 1.375 | 14 | EVAL Copolymer (2) | 25 | PA12(a) | 5.8-6.1 | Co-Extrusion Coating |
| Ex. 16 | 3FM/17FM/MMA/MAA (51/31/17/1) | 1.417 | VdF/TFE/HFP (48/43/9) | 1.375 | 14 | POM Resin (Copolymer) | 145 | PA12(a) | 0.7-0.9 | Co-Extrusion Coating |
| Ex. 17 | 3FM/17FM/MMA/MAA (51/31/17/1) | 1.417 | VdF/TFE/HFP (48/43/9) | 1.375 | 14 | POM Resin (Homopolymer) | 77 | PA12(a) | 0.7-0.9 | Co-Extrusion Coating |
| Ex. 18 | 3FM/17FM/MMA/MAA (51/31/17/1) | 1.417 | VdF/TFE/HFP (48/43/9) | 1.375 | 14 | PVdF + VdF/TFE/HFP Copolymer | 47 | PA12(a) | 3.4-3.6 | Co-Extrusion Coating |
| Com. Ex. 3 | 3FM/17FM/MMA/MAA (51/31/17/1) | 1.417 | VdF/TFE (80/20) | 1.402 | 60 | MMA/MAA/17FM (85/1/14) | 45 | PA12(a) | 0.9-1.2 | Co-Extrusion Coating |
| Com. Ex. 4 | 3FM/17FM/MMA/MAA (51/31/17/1) | 1.417 | VdF/TFE/HFP (48/43/9) | 1.375 | 14 | MMA/MAA/17FM (85/1/14) | 45 | PA12(b) | 0.9-1.2 | Co-Extrusion Coating |
| Com. Ex. 5 | 3FM/17FM/MMA/MAA (51/31/17/1) | 1.417 | VdF/TFE/HFP/PFPVE (21/55/18/6) | 1.350 | 11 | PBT Resin (3) | 44 | PA12(b) | 1.4-1.7 | Co-Extrusion Coating |

TABLE 1-continued

| | First Clad | | Second Clad | | ΔH | Protective Coating Layer | | Light Blocking | Difference in | Method for |
|---|---|---|---|---|---|---|---|---|---|---|
| | Composition (% by weight) | Refractive Index | Composition (% by weight) | Refractive Index | (mJ/ mg) | Material (% by weight) | MI (g/10 min) | Coating Layer Material | Miscibility Parameter (ΔSP) | Forming Protective Coating Layer |
| Com. Ex. 6 | 3FM/17FM/ MMA/MAA (51/31/17/1) | 1.417 | VdF/TFE/HFP/ PFPVE (21/55/18/6) | 1.350 | 11 | EVAL Copolymer (2) | 25 | PA12(b) | 5.8-6.1 | Co-Extrusion Coating |

TABLE 2

| | Pullout Strength (N) | POF Initial | POF Cable Initial | After Heat Resistance Test (105° C. × 5000 h) |
|---|---|---|---|---|
| Com. Ex. 1 | — | 134 | 135 | >1000 |
| Com. Ex. 2 | 14N | 135 | 136 | 540 |
| Ex. 1 | 35N | 134 | 135 | 190 |
| Ex. 2 | 34N | 134 | 136 | 188 |
| Ex. 3 | 31N | 132 | 135 | 190 |
| Ex. 4 | 27N | 132 | 135 | 185 |
| Ex. 5 | 35N | 134 | 135 | 220 |
| Ex. 6 | 45N | 132 | 135 | 180 |
| Ex. 7 | 35N | 132 | 137 | 180 |
| Ex. 8 | 36N | 132 | 135 | 180 |
| Ex. 9 | 40N | 133 | 136 | 180 |
| Ex. 10 | 10N | 135 | 137 | 170 |
| Ex. 11 | 12N | 135 | 140 | 175 |
| Ex. 12 | 15N | 134 | 140 | 180 |
| Ex. 13 | 14N | 134 | 138 | 185 |
| Ex. 14 | 44N | 134 | 135 | 328 |
| Ex. 15 | 46N | 134 | 135 | 307 |
| Ex. 16 | 41N | 134 | 137 | 340 |
| Ex. 17 | 40N | 134 | 136 | 350 |
| Ex. 18 | 40N | 134 | 135 | 206 |
| Com. Ex. 3 | 32N | 135 | 138 | 650 |
| Com. Ex. 4 | 35N | 134 | 136 | 890 |
| Com. Ex. 5 | 30N | 135 | 137 | 910 |
| Com. Ex. 6 | 43N | 135 | 136 | 960 |

Abbreviations in Table 1 represent the following compounds.
VdF: vinylidene fluoride
TFE: tetrafluoroethylene
HFP: hexafluoropropylene
TFMVE: perfluoro-trifluoro(methylvinylether) ($CF_2$=$CFOCF_3$)
PFPVE: perfluoro-pentafluoro(propylvinylether) ($CF_2$=$CFOCH_2CF_2CF_3$)
MMA: methyl methacrylate
MAA: methacrylic acid
BA: butyl acrylate
GMA: glycidyl methacrylate
3FM: 2,2,2-trifluoroethyl methacrylate
4FM: 2,2,3,3-tetrafluoropropyl methacrylate
5FM: 2,2,3,3,3-pentafluoropropyl methacrylate
17FM: 2-(perfluorooctyl)ethyl-methacrylate
BA: butyl acrylate
PA12(a): nylon 12 (Daicel-Degussa Ltd., Model Name: Daiamide-L1640)
PA12(b): nylon 12 (EMS-Showa Denko, Model Name: Grilamide L16A)
PA11: nylon 11 (Atofina, Model Name: RILSAN BMF-0)
PC(1): polycarbonate resin (GE Plastics, Model Name: Lexan OQ1020C)
PC(2): polycarbonate resin (custom-made, polymer compound having a structure formed of bisphenol A and phosgene, MI=100 g/10 minutes)
PC Olygomer: low molecular weight polycarbonate resin (Mitsubishi Engineering-Plastics Corporation, Model Name: Iupilon AL071)
PMMA Oligomer: low molecular weight polymethyl methacrylate (Mitsubishi Rayon Co., Ltd., Mn=4000)
PC-g-PSt: polymer obtained by performing graft polymerization of a PC resin and styrene (NOF Corporation, Model Name: Modiper CL150D)
MMA-GMA: copolymer of MMA and GMA (composition ratio: 70/30, Mitsubishi Rayon Co., Ltd.)
EVAL Copolymer (1): ethylene-vinyl alcohol copolymer (composition ratio: 47/53 mol %, Kuraray Co., Ltd., Model Name: EVAL G156)
EVAL Copolymer (2): ethylene-vinyl alcohol copolymer (composition ratio: 32/68 mol %, Kuraray Co., Ltd., Model Name: EVAL F104)
PBT Resin (2): polybutylene terephthalate resin (Toray-DuPont Co., Ltd., Model Name: Hytrel 4047)
PBT Resin (3): polybutylene terephthalate resin (Toray-DuPont Co., Ltd., Model Name: Hytrel 4057)
PBT Resin (4): polybutylene terephthalate resin (Toray-DuPont Co., Ltd., Model Name: Hytrel 4767)
POM Resin (Copolymer): polyacetal resin (Polyplastics Co., Ltd., Model Name: DYURACON M450)
POM Resin (Homopolymer): polyacetal resin (Du Pont, Model Name: Derlin 1700P)
PVdF+VdF/TFE/HFP Copolymer: resin composition obtained by mixing 80 weight parts of polyvinylidene fluoride resin (Arkema K.K., Model Name: KYNAR 710), 20 weight parts of low molecular weight VdF/TFE/HFP copolymer (Arkema K.K., Model Name: KYNAR 9301), and one weight part of carbon black

The invention claimed is:
1. A plastic optical fiber cable comprising:
A plastic optical fiber having a core-clad structure: and
A light blocking coating layer provided around the plastic optical fiber,
wherein the outermost layer of the core/clad structure is made of a fluorine-containing olefin polymer containing at least a tetrafluoroethylene unit, the crystal melting heat of the fluorine-containing olefin polymer being 59 mJ/mg or lower;
the light blocking coating layer is made of a resin primarily containing a polyamide resin, the total content of polyamide resin-derived monomer compounds and oligomer compounds being 1.5% by weight or lower; and the plastic optical fiber cable further comprises a protective coating layer provided between the outermost layer of the core/clad structure and the light blocking coating layer.

2. The plastic optical fiber cable according to claim 1, wherein the resin that forms the light blocking coating layer contains a terminal amino group, the content of which is 100 µeq/g or lower.

3. The plastic optical fiber cable according to claim 1, wherein the miscibility parameter (SP value) of the protective coating layer, SP1, and the miscibility parameter (SP value) of the monomers and oligomers contained in the polyamide resin that is the primary component of the light blocking coating layer, SP2, satisfy the following equation:

$$|SP1-SP2| \geq 0.2.$$

4. The plastic optical fiber cable according to claim 1, wherein the protective coating layer is made of any of a resin containing a methyl (meth)acrylate unit, a resin primarily formed of a styrene unit, a polycarbonate resin, a resin primarily formed of a propylene unit, a resin primarily containing a ethylene-vinyl alcohol copolymer, a polybutylene terephthalate resin, and a polyacetal resin.

5. The plastic optical fiber cable according to claim 1, wherein the protective coating layer is made of a resin containing 85 to 97% by weight of a vinylidene fluoride unit.

6. The plastic optical fiber cable according to claim 1, wherein the protective coating layer is made of a resin containing a copolymer unit having at least one of an acid anhydride group, a carboxylic acid group, and a glycidyl group.

* * * * *